US008730088B2

(12) United States Patent
Milligan et al.

(10) Patent No.: US 8,730,088 B2
(45) Date of Patent: May 20, 2014

(54) RADAR COHERENT PROCESSING INTERVAL SCHEDULING VIA AD HOC NETWORK

(75) Inventors: Stephen D. Milligan, Stow, MA (US); Jason Redi, Belmont, MA (US); Jonathan Fisher, North Dartmouth, MA (US); Daniel Sumorok, Medford, MA (US); Steven W. Weeks, North Andover, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 468 days.

(21) Appl. No.: 12/984,736

(22) Filed: Jan. 5, 2011

(65) Prior Publication Data

US 2012/0032833 A1    Feb. 9, 2012

Related U.S. Application Data

(60) Provisional application No. 61/371,850, filed on Aug. 9, 2010.

(51) Int. Cl.
*G01S 13/00* (2006.01)

(52) U.S. Cl.
USPC ............... 342/57; 342/52; 342/58; 342/73; 342/88; 342/89; 342/175

(58) Field of Classification Search
USPC ............... 342/52, 57, 59, 73, 82, 88, 89, 175
See application file for complete search history.

(56) References Cited

U.S. PATENT DOCUMENTS

| 3,394,372 | A | * | 7/1968 | Schrader ................... 342/175 |
| 4,093,153 | A | * | 6/1978 | Bardash et al. ............. 244/3.14 |
| 4,291,309 | A | * | 9/1981 | Spiller et al. ................ 342/82 |
| 4,733,238 | A | * | 3/1988 | Fiden ........................ 342/60 |
| 4,866,447 | A | * | 9/1989 | Loucks ....................... 342/58 |
| 5,093,663 | A | * | 3/1992 | Baechtiger et al. ......... 342/60 |
| 5,128,683 | A | * | 7/1992 | Freedman et al. ........ 342/158 |
| 5,241,542 | A | * | 8/1993 | Natarajan et al. ......... 370/311 |
| 5,920,279 | A | * | 7/1999 | Andersson .................. 342/59 |
| 5,955,984 | A | * | 9/1999 | Schober et al. ............ 342/159 |
| 5,966,091 | A | * | 10/1999 | Andersson .................. 342/60 |

(Continued)

FOREIGN PATENT DOCUMENTS

EP          2154917 A1     2/2010

OTHER PUBLICATIONS

Int'l. Search Report mailed Dec. 9, 2011 in corresponding International Application No. PCT/US2011/046444.

*Primary Examiner* — Peter Bythrow
(74) *Attorney, Agent, or Firm* — Chapin IP Law, LLC

(57) ABSTRACT

Techniques disclosed herein include systems and methods for accurately scheduling radar and radio events against each other. Specifically, a scheduling manager can schedule radar events based on scheduled radio events (wireless network communication events). A given radio schedule for a compact radar sensor can be a relatively complicated schedule, especially when the compact radar sensor operates as part of an ad hoc network. In certain embodiments, the scheduling manager identifies a radio transmission schedule of neighboring radar nodes or compact radar sensor units. Such a radio transmission schedule of neighboring nodes can include information on when neighboring nodes will be receiving or transmitting data. The scheduling manager then schedules radar events to be executed by the radar device at available times, or at times that do not overlap with scheduled radio events.

20 Claims, 5 Drawing Sheets

(56) References Cited

U.S. PATENT DOCUMENTS

| | | | |
|---|---|---|---|
| 6,621,454 B1* | 9/2003 | Reudink et al. | 342/367 |
| 6,714,157 B2* | 3/2004 | Wittenberg | 342/191 |
| 6,928,061 B1* | 8/2005 | Garcia-Luna-Aceves et al. | 370/329 |
| 7,369,484 B1* | 5/2008 | Prismantas et al. | 370/201 |
| 7,423,577 B1* | 9/2008 | McIntire et al. | 342/57 |
| 7,453,391 B1* | 11/2008 | McIntire et al. | 342/57 |
| 7,515,091 B2* | 4/2009 | Meyers et al. | 342/57 |
| 7,538,713 B1* | 5/2009 | Thomson et al. | 342/57 |
| 7,545,309 B1* | 6/2009 | McIntire et al. | 342/57 |
| 7,570,196 B1* | 8/2009 | Mower et al. | 342/57 |
| 7,633,426 B2* | 12/2009 | Sutphin | 342/22 |
| 7,675,840 B1* | 3/2010 | Prismantas et al. | 370/201 |
| 7,769,105 B1* | 8/2010 | McIntire et al. | 375/309 |
| 7,965,226 B2* | 6/2011 | Krikorian et al. | 342/131 |
| 7,978,610 B1* | 7/2011 | McIntire et al. | 370/236.2 |
| 8,116,688 B2* | 2/2012 | Matsumoto et al. | 455/63.1 |
| 8,169,358 B1* | 5/2012 | Bourdelais et al. | 342/52 |
| 8,254,433 B2* | 8/2012 | Baker et al. | 375/219 |
| 2004/0047324 A1* | 3/2004 | Diener | 370/338 |
| 2006/0232463 A1* | 10/2006 | Burton et al. | 342/42 |
| 2007/0139253 A1* | 6/2007 | Meyers et al. | 342/57 |
| 2007/0256075 A1* | 11/2007 | Denis | 718/102 |
| 2008/0170559 A1* | 7/2008 | Zumsteg | 370/350 |
| 2009/0009391 A1* | 1/2009 | Fox et al. | 342/372 |
| 2009/0015461 A1* | 1/2009 | Pitt et al. | 342/57 |
| 2009/0045997 A1* | 2/2009 | Meyers et al. | 342/60 |
| 2009/0135044 A1* | 5/2009 | Sutphin | 342/22 |
| 2009/0135046 A1* | 5/2009 | Steele et al. | 342/27 |
| 2009/0146866 A1* | 6/2009 | Matsumoto et al. | 342/52 |
| 2009/0237293 A1* | 9/2009 | Sakuma | 342/146 |
| 2009/0323782 A1* | 12/2009 | Baker et al. | 375/219 |
| 2010/0002656 A1* | 1/2010 | Ji et al. | 370/336 |
| 2010/0194622 A1* | 8/2010 | Clingman et al. | 342/37 |
| 2011/0190027 A1* | 8/2011 | Michel et al. | 455/522 |
| 2012/0050089 A1* | 3/2012 | Gurevich et al. | 342/59 |

\* cited by examiner

RADAR COHERENT PROCESSING INTERVAL SCHEDULING VIA AD HOC NETWORK

CROSS REFERENCE TO RELATED APPLICATIONS

The present application claims the benefit of U.S. Provisional Patent Application No. 61/371,850, filed on Aug. 9, 2010, entitled "Radar Coherent Processing Interval Scheduling Via Ad Hoc Network," which is incorporated herein by reference in its entirety.

BACKGROUND

The present disclosure relates to radar systems and methods. Radar is an object detection system that uses electromagnetic waves to identify range, altitude, direction, and/or speed of both moving and fixed objects such as aircraft, ships, motor vehicles, weather formations, terrain and people. Radar is sometimes referred to as radio detection and ranging. Conventional radar systems have a transmitter that emits radio waves. When transmitted radio waves contact an object the radio waves are scattered in all directions. A portion of the radio waves is thus reflected back towards the radar system. Reflected radio waves have a slight change of wavelength (and thus frequency) if the target is moving. Radar systems also include a receiver. The receiver is typically located in a same location as the transmitter. Although the reflected signal is usually very weak, the reflected signal can be amplified through use of electronic techniques in the receiver and in the antenna configuration. Such amplification enables a radar unit to detect objects at ranges where other emissions from a target object, such as sound or visible light, would be too weak to detect. Radar uses include meteorological detection of precipitation, measuring ocean surface waves, air traffic control, police detection of speeding traffic, and military applications.

The present disclosure also relates to networks. One type of network is known as a wireless ad hoc network. A wireless ad hoc network is a decentralized wireless network. The network is ad hoc because it does not rely on a preexisting infrastructure, such as routers in wired networks or access points in managed (infrastructure) wireless networks. Instead, each node participates in routing by forwarding data for other nodes, and so the determination of which nodes forward data is made dynamically based on the network connectivity. The decentralized nature of wireless ad hoc networks makes them suitable for a variety of applications where central nodes cannot be relied on, and may improve the scalability of wireless ad hoc networks compared to wireless managed networks. Minimal configuration and quick deployment make ad hoc networks suitable for emergency situations like natural disasters or military conflicts.

An ad-hoc network is made up of multiple "nodes" connected by "links". Links are influenced by the node's resources (e.g. available energy supply, transmitter power, computing power and memory) and by behavioral properties (reliability, and trustworthiness), as well as by link properties (e.g. line-of-sight interference, length-of-link and signal loss, interference and noise). Since new and old links can be connected or disconnected at any time, a functioning network must be able to cope with this dynamic restructuring, preferably in a way that is timely, efficient, reliable, robust and scalable. The network must allow any two nodes to communicate, often via other nodes that relay the information. A "path" is a series of links that connects two nodes. Often there are multiple paths between any two nodes. Many of these applications use battery-powered nodes whose uninterrupted service life is limited by the energy efficiency of the node itself.

SUMMARY

Conventional radar systems for use in force protection applications, surveillance applications, and other applications, have been large, heavy units, primarily intended for permanent installation around a perimeter to be protected or mounted on specialized equipment, making such systems impractical for use in a tactical deployment.

Radar systems developed in association with this disclosure, however, include a radar sensor system that includes relatively compact radar sensor units. Such a compact radar system can include one or more portable radar devices that can be positioned and repositioned at various locations. Individual radar devices can be sized relatively smaller than conventional radar units. For example, a given compact radar device can be sized similar to the size of a beverage can or bottle. These compact radar devices or sensors can be deployed in groups to form a network of radar nodes. Each radar node can communicate with neighboring radar nodes to communicate collected radar data. An example capability of such a network is detection and tracking of humans in difficult sensing environments. A system of networked compact radar sensors can provide critical advanced warning of intruders in situations where detection time is critical.

Such systems can offer superior size and weight characteristics, and exceptional target detection and localization capabilities. Such systems can also employ low-power networking capability for communications, allowing for both remote system control as well as data filtration for remote use by handheld devices.

For combined radar operations and wireless networking, such compact radar units include two radio frequency (RF) modules, or two types of wireless signaling modules, within one box or housing. Note that the two modules can be either logical or physical, that is, the radar unit can be a single RF device that executes both Radar and ad hoc networking, or, alternatively, the two functions can be separated. The radio unit splits operation of the RF modules into time slots. For wireless network communications, the radio unit uses random/pseudorandom timeslots. Using random time slots increases security and stealth of network communications by increasing difficulty in finding or identifying wireless signals.

While radar signaling and network radio data traffic can be transmitted simultaneously, it is desirable to schedule radar events to occur in open or available time slots, meaning time slots when there are no active radio communications. In other words, it is desirable to scheduling radar signaling to occur at times that avoid or do not overlap with radio transmissions. This is desirable for at least a couple of reasons. One reason is that simultaneous scheduling can result in possible co-site interference, that is, where the radio signals and the radar signals interfere with each other. While radio band frequencies and radar band frequencies can be configured at a sufficient distance from each other so that there should be no interference during simultaneous broadcasting, it is nevertheless possible that radio frequency energy can disrupt other components of the radar unit. Thus, techniques herein include a system designed to avoid mutual interference.

Another reason to avoid scheduling radar and radio events to execute simultaneously is to avoid exceeding available peak power of an associated power system. For example, turning on radar transmission and radio transmissions simultaneously can accelerate battery depletion and/or require more power than is available from a given power supply. By way of a more specific example, certain battery chemistries, such as lithium-thylenol batteries, provide a benefit of extremely long battery life, but with a trade-off result of a relatively low peak power draw. Even using a supercapacitor, a radar unit using a lithium-thylenol battery is limited in the amount of power that can be drawn from the battery. Thus, such non-overlapping radar and radio scheduling can enable moderating battery usage to match a given battery's chemistry.

While radar signaling periods can vary, conventional radar event scheduling is typically structured with a specific time period between radar events, so that radar events occur at consistent time intervals. Given that in certain embodiments of radar units, radio events can be scheduled to occur at random times, the eventual consequence is that some random radio events will coincide with periodic or interval-based radar events.

Techniques disclosed herein include systems and methods for carefully scheduling events against each other. Specifically, a scheduling manager schedules radar events based on scheduled radio events. This includes Radar Coherent Processing Interval (CPI) scheduling. CPI is a parameter used to describe Radar systems.

In one embodiment, the scheduling manager receives radar configuration parameters that indicate an interval for executing radar events at a radar device. This radar device has both radar circuitry for executing radar events and radio circuitry for communicating with a network of devices or radar nodes. The scheduling manager analyzes a schedule of radio events associated with the radar device to identify when radio events are scheduled to be executed. The scheduling manager can then schedule radar events to be executed by the radar device at times that avoid execution of scheduled radio events, that is, radar events are scheduled at times when there is no scheduled radio transmission.

In another embodiment a scheduling manager (such as a software process executed by a specific computer device) receives radar configuration parameters that include instructions to execute radar events at a radar device. The radar device includes radar circuitry that executes radar events. The radar events include transmitting radio waves and receiving reflected radio waves to detect external objects. The radar device includes radio communication circuitry that executes wireless network communication events including communication transmissions (transmitting and receiving) with peer radar devices.

The scheduling manager analyzes a schedule of wireless network communication events that corresponds to the radar device. The scheduling manager identifies time slots in the schedule as either scheduled for execution of wireless network communication events or available time slots. The scheduling manager then schedules radar events to be executed by the radar device during available time slots within the schedule. The radar events are then executed according to the schedule and radar configuration parameters.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA) and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving radar configuration parameters that include instructions to execute radar events at a radar device, the radar device including radar circuitry that executes radar events, the radar events including transmitting radio waves and receiving reflected radio waves to detect external objects, the radar device including radio communication circuitry that executes wireless network communication events including communication transmissions with peer radar devices; analyzing a schedule of wireless network communication events that corresponds to the radar device; identifying time slots in the schedule as either scheduled for execution of wireless network communication events or available time slots; scheduling radar events to be executed by the radar device during available time slots within the schedule; and executing the radar events according to the schedule and radar configuration parameters. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by BBN Technologies, Cambridge, Mass.

As discussed above, techniques herein are well suited for use in software applications supporting radar-scheduling applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
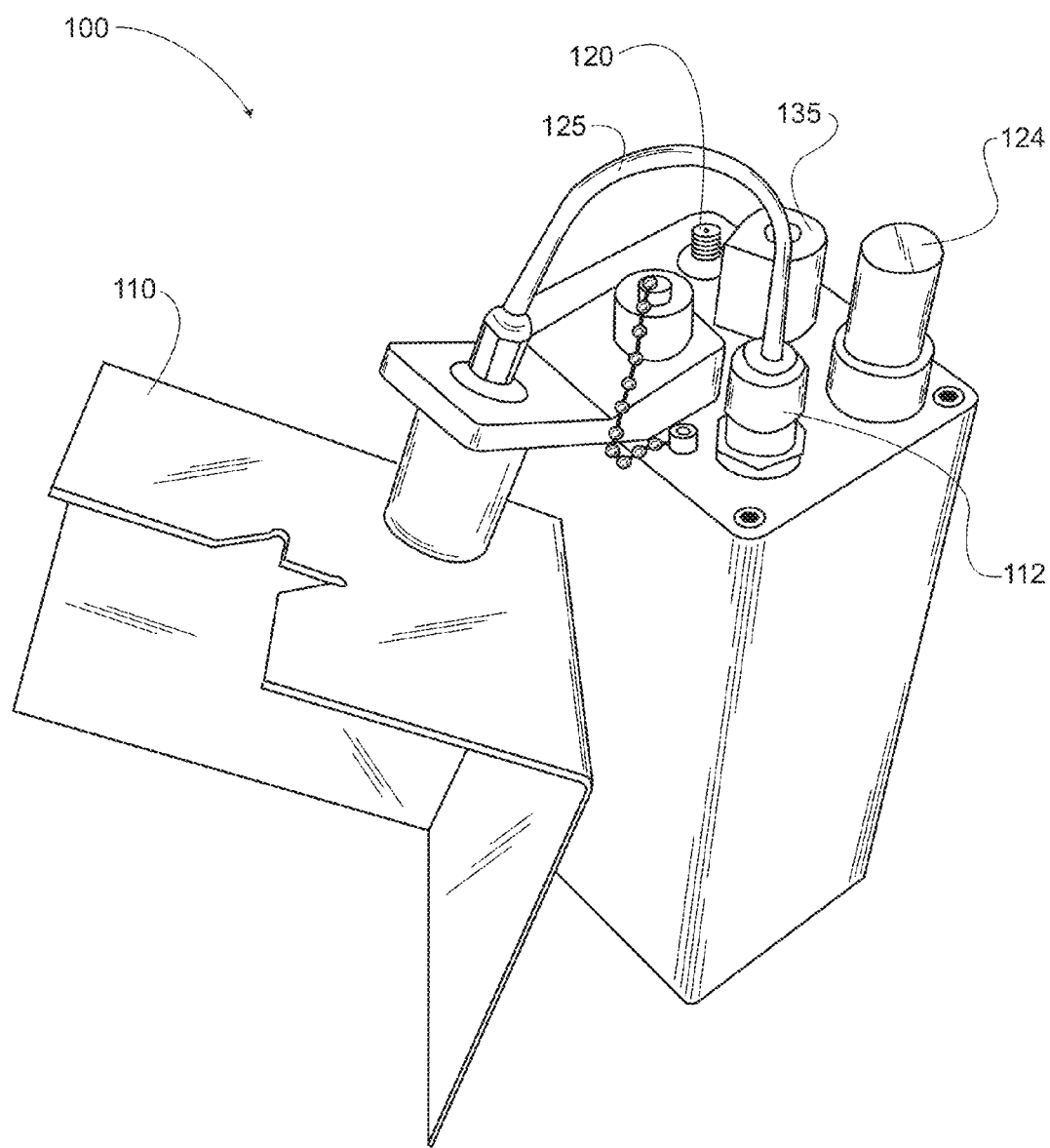
FIG. 1 is an illustration of an example radar sensor device according to embodiments herein.

Techniques disclosed herein include systems and methods for accurately scheduling radar and radio events against each other and/or based on each other. Specifically, a scheduling manager can schedule radar events based on scheduled radio events, that is, based on wireless network communication events. A given radio schedule for a compact radar sensor can be a relatively complicated schedule, especially when the compact radar sensor operates as part of an ad hoc network. For example, in certain embodiments, the scheduling manager identifies a radio transmission schedule of neighboring radio nodes or compact radar sensor units. Such a radio transmission schedule of neighboring nodes can include information on when neighboring nodes will be transmitting and/or receiving data.

A given radar unit/compact radar sensor device as a whole can include radar functionality plus ad hoc networking functionality. In other words, each radar box can function as a node within an ad hoc network. These nodes can communicate with each other, find each other, and determine the most efficient path for transmitting data back and forth based on various factors such as battery consumption, and remaining battery power within a given radar unit.

Identifying such a schedule of neighboring nodes is especially useful when used with low-energy networks. In low-energy networks, each compact radar sensor can be configured in various component sleep settings. For example, either the transmitter and/or the receiver may be turned off between radar/radio events. Thus, a particular low-energy network can be configured to turn off both a receiver and transmitter between events. Low energy networks can adapt to a traffic load. To reduce energy, rather than having a receiver listen all of the time, pseudo-random schedules shared among neighbors indicate when neighboring nodes will be awake for reception or asleep. Such a design also provides adaptability to support a wide range of performance in response to various needs. Under low offered loads (a lowest energy mode), a schedule defines when a node will be awake and allow nodes to opportunistically transmit in any slot. Under high offered loads, channel time is divided up among nodes to provide collision-free transmit schedules. Under all loads, the pseudo-random schedules are used to provide collision-free slots for transmission of critical control information such as heartbeat beacons or routing packets.

Thus, by identifying schedules of neighboring nodes, a given radar unit can determine when a second radar unit is going to be awake to listen for a transmission or to send a transmission. In this example, a first radar unit can schedule itself to wake up when the second radar unit wakes up, to send and receive radio transmissions. Subsequently, the first and second radar units can return to a sleep state or at least a radio sleep state to preserve battery life. In some embodiments, a receiver's schedule can control system scheduling, including when neighboring radar units will wake to execute events.

The scheduling manager can operate by scheduling radar events within a schedule of radio events so as to avoid interference and preserve battery life. The ad hoc radio can have various types or categories of scheduled events. Categories can include transmitting collected radar information, transmitting heartbeats, transmitting instructions, etc. In operation, radar nodes can generate and exchange pseudo random numbers. After exchanging scheduling information, a given node can organize or arrange events in time slots to build a list of scheduled events—which is also a list of available slots for scheduling radar events. A given radio event may not occupy an entire time slot, but instead occupy just a portion of a slot. For example, at the very beginning of a time slot the system listens for a preamble. If the preamble is received then the system will execute corresponding functionality. But if the preamble is not received within a predetermined time (such as within a millisecond), then the system can return to a sleep mode. Accordingly there can be relatively narrow windows or available times on which to send transmissions to other radar units.

The scheduling manager can then schedule radar events based on various scheduled network radio events. In one embodiment, the scheduling manager of the radar unit analyzes its own schedule and analyzes schedules of other radar unit devices in the neighborhood. This can include one-hop neighbors and/or other nodes within radio range. The scheduling manager can then build a list of schedules of neighboring devices. The scheduling manager uses a combined list of schedules to identify available timeslots in which to perform radar events. For example, if a given radar unit is configured with a one-second interval schedule, then the scheduling manager will look within a given time period of one second to find an available timeslot to perform a radar event. Subsequently, the scheduling manager will look within a next second (or other unit of time) to find an available timeslot. The scheduling manager continues this process with consecutive time intervals of one second to identify open or available gaps or periods in which to perform radar events. In an embodiment where radar events are scheduled after radio scheduling, time intervals between radar events will not always be uniform since the radio scheduling can be configured to take priority. In practice, and with respect to this example of one second interval scheduling, some radar events might be close to two seconds apart, while other radar events might be substantially less than one second part. In a scenario where the radio is busy performing network transmission, such as identifying a new location where a neighboring radar unit moved, then the radar device can temporarily shut the radar module off until new time slots are available for radar transmissions. While the radar scheduler might be aware of a radio schedule, the radio scheduler might not be aware of the radar schedule. In other embodiments, the scheduling manager can balance radar and radio priorities, such as during a possible intrusion event within a radar field when it is determined necessary to continue uninterrupted radar operations.

Figure 2:
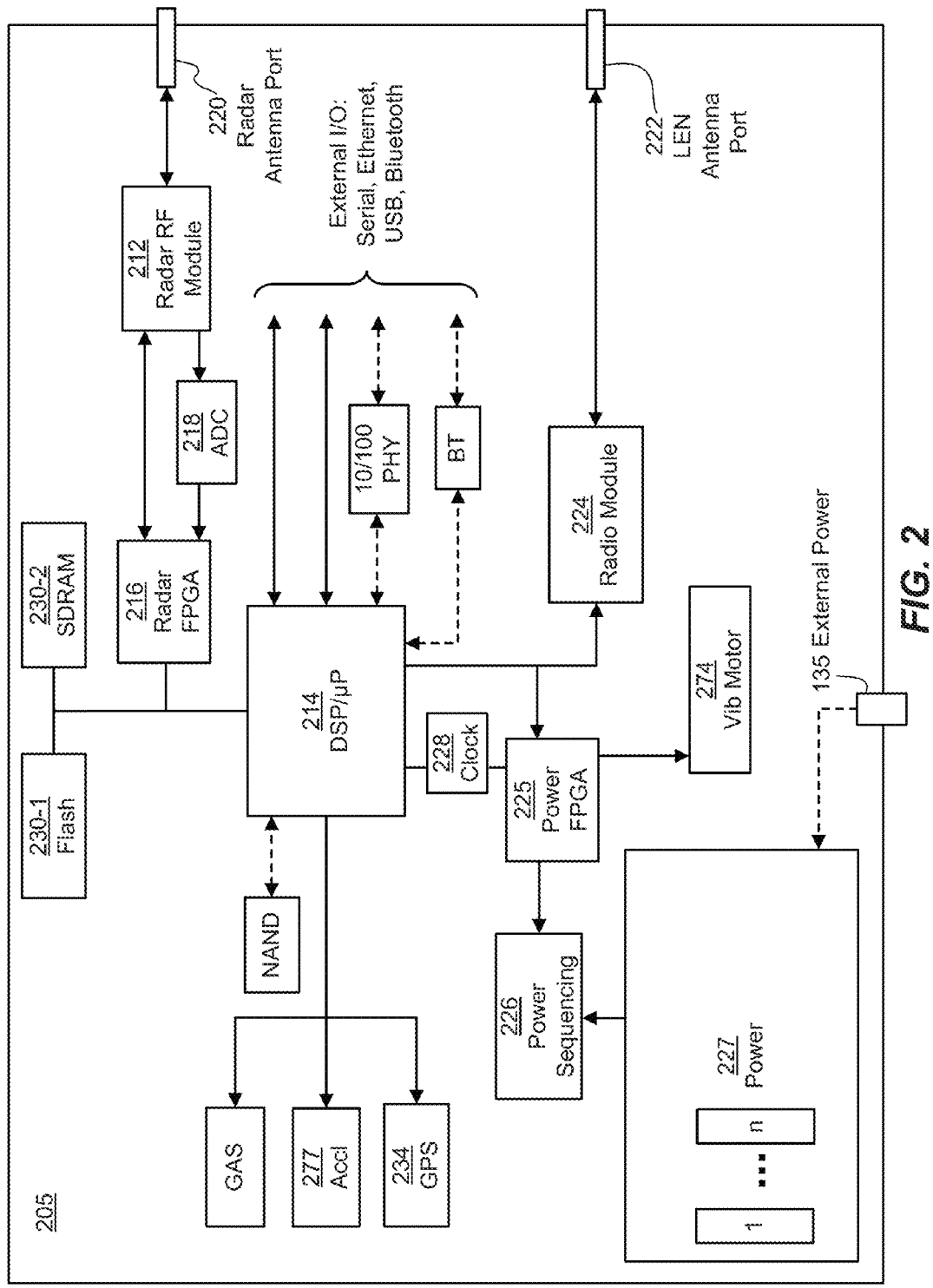
FIG. 2 is a block diagram of example system architecture for a low-energy ad hoc radar sensor device according to embodiments herein.

Referring now to FIG. 1 in conjunction with FIG. 2, FIG. 1 depicts an example radar device 100 having different types of transmission functionality (radar, radio, GPS). Radar device 100 can receive and transmit radar signals using radar antenna 110 and radar antenna port 112. The example illustration shows radar antenna 110 mounted to radar device 100. In alternative embodiments, the radar antenna 110 can be positioned away from radar device 100, such as being positioned in a tree while being connected to radar device 100 via radar antenna port 112. Radar device 100 can also receive and transmit radio communications via radio antenna port 120, such as communicating with peer radar devices that can be positioned hundreds of yards or several miles away. Radio antenna port 120 can also be used to receive wireless signals from a relatively close location, for example, within about 50 feet depending on signal strength. Radar antenna 110 can double as a radio antenna. Alternatively, a separate radio antenna can be used with radio port 120. Both the radar and radio antennas can be attached to the device 100 remotely via a cable. GPS antenna 124 can be used to provide location information. Power switch 135 can be used to power-on or power-off radar device 100.

FIG. 2 depicts a block diagram 205 of a radar device 100, which can be embodied as a low-energy ad hoc network node, radar sensor unit, or relay node that performs scheduling processes according to embodiments as disclosed herein. The radar device 100 includes power circuitry 226, which is used to provide, sequence, and control power to various other components of the system in combination with Power FPGA 225. The power circuitry 226 can be armed and disarmed with respect to a position of an external power switch 135. A power source 227 can include one or more batteries. Radar device 100 also includes radio module 224 having a port 222 for a wireless communication antenna (e.g., a Low Energy Network (LEN) antenna). Radio module 224 and antenna are used to provide wireless network communication with other wireless systems.

A Radar RF module 212 is also shown having a port 220 for radar antenna 110. Also shown is a Global Positioning System (GPS) module 234, which is used to provide location information regarding the device 100. Device 100 further includes clock distribution circuitry 228 for distributing and synchronizing various clocks across the device 100. An Analog to Digital Converter (ADC) 218 is included and a wakeup timer circuit is used for controlling various components according to when respective components should be active, such as in power management.

Radar device 100 also includes memory circuitry 230, which is used for storing various state and acquired information (e.g. radar events, audio data, video data, GPS position data (or the like)) for later retrieval and/or transmission. In this example, memory is shown as 230-1 Flash and 230-2 SDRAM. Also shown is Field Programmable Gate Array (FPGA) 216 and Digital Signal Processor (DSP) 214. A vibrator or vibrator motor 274 can be coupled to radar device 100, along with accelerometer 277. Vibrator 274 can be any conventional vibration motor or vibration technique. Device 100 can also include circuitry and interfaces for external inputs and outputs, such as serial connections, Ethernet, USB, Bluetooth, etc. The memory 230 can include instructions for the processor (such as digital signal processor 214) to execute a scheduling manager process and application.

Operational software in the nodes(s) is executed on the DSP 214, which also functions as the microcontroller in the system. Radar processing, initiation of power management, radio, GPS, vibrator control, etc. can all be run by software executed by the DSP 214. Note that an actual configuration for carrying out the scheduling manager can vary depending on a respective application. For example, radar device 100 can include one or multiple computers or computer processors that carry out the processing as described herein. In alternative embodiments, radar device 100 can be any of various types of networking devices.

Functionality associated with the scheduling manager will now be discussed via flowcharts in FIGS. 3-5. For purposes of the following discussion, the scheduling manager or other appropriate entity performs steps in the flowcharts.

Figure 3:
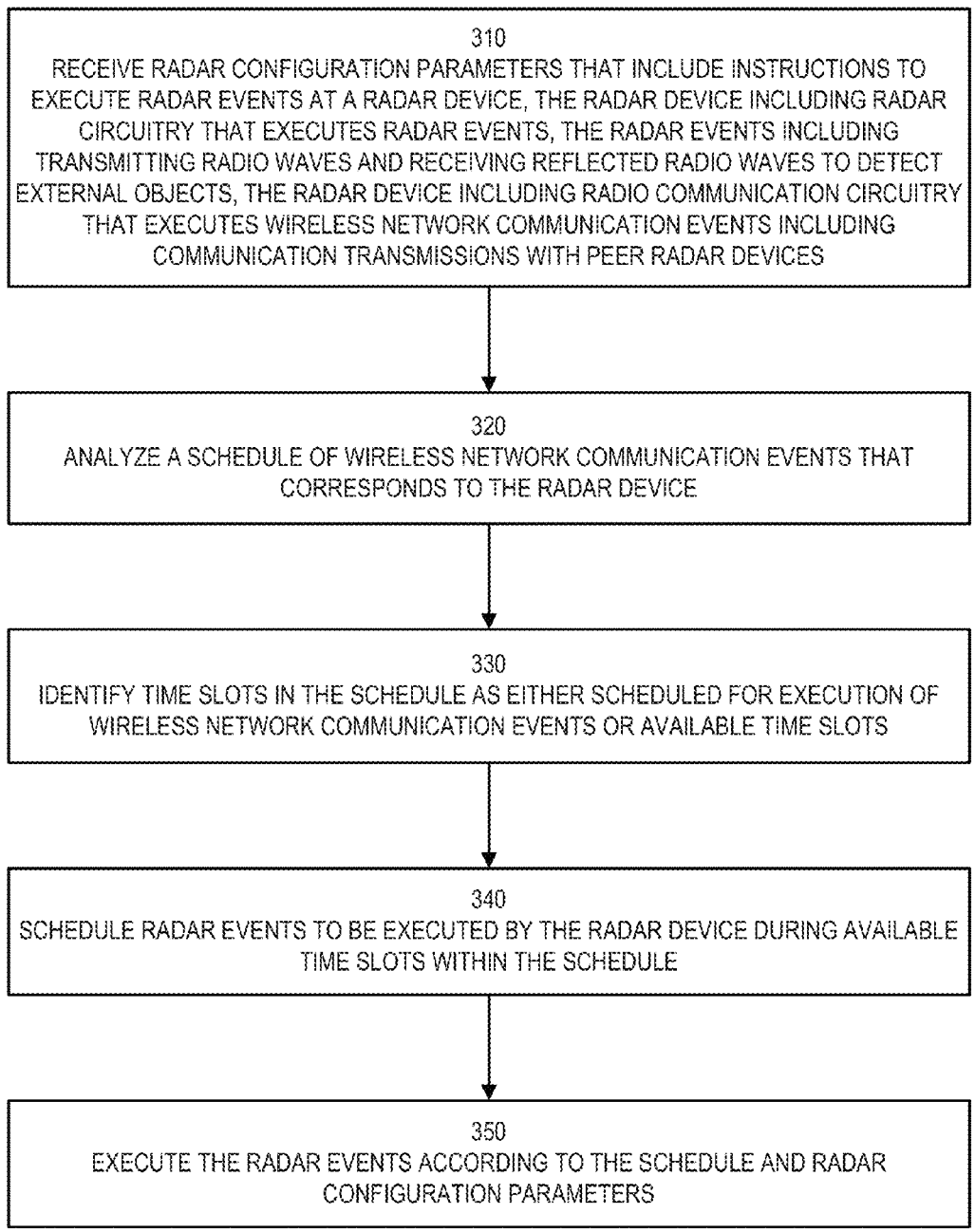
FIGS. 3-5 are flowcharts illustrating an example process supporting radar sensor status indication according to embodiments herein.

Now describing embodiments more specifically, FIG. 3 is a flow chart illustrating embodiments disclosed herein.

In step 310, the scheduling manager receives radar configuration parameters that include instructions to execute radar events at a radar device. For example, such configuration parameters can instruct to begin radar events and a type of radar signals to transmit. The radar device includes radar circuitry that executes radar events. The radar events include transmitting radio waves and receiving reflected radio waves to detect external objects, such as people, vehicles, etc. The radar device includes radio communication circuitry that executes wireless network communication events including communication transmissions with peer radar devices. Communication transmissions include transmitting and receiving network radio signals.

In step 320, the scheduling manager analyzes a schedule of wireless network communication events that corresponds to the radar device. In other words, the radar device uses the schedule to identify when to execute radio events.

In step 330, the scheduling manager identifies time slots in the schedule as either scheduled for execution of wireless network communication events or available time slots. Note that "time slot" refers to spans of time, periods of times, or instances of time. For example, different types of radar and radio events can take different amounts of time to execute, and so each respective time slot can be a different duration than other time slots. In other embodiments, all time slots can be of uniform duration or spacing. Also note that time slots can also include sub time slots or other divisions. For example, a given schedule corresponding to (used by) the radar device can use a schedule of uniforms time slots spanning discrete units of time, while various events can then span an entire time slot, a portion of a time slot, or multiple time slots.

In step 340, the scheduling manager schedules radar events to be executed by the radar device during available time slots within the schedule. In other words, the scheduling manager schedules radar events to occur at times that do not overlap with radio events.

In step 350, the radar device executes the radar events according to the schedule and radar configuration parameters, thereby performing radio and radar events that do not interfere with each other.

Figure 4:
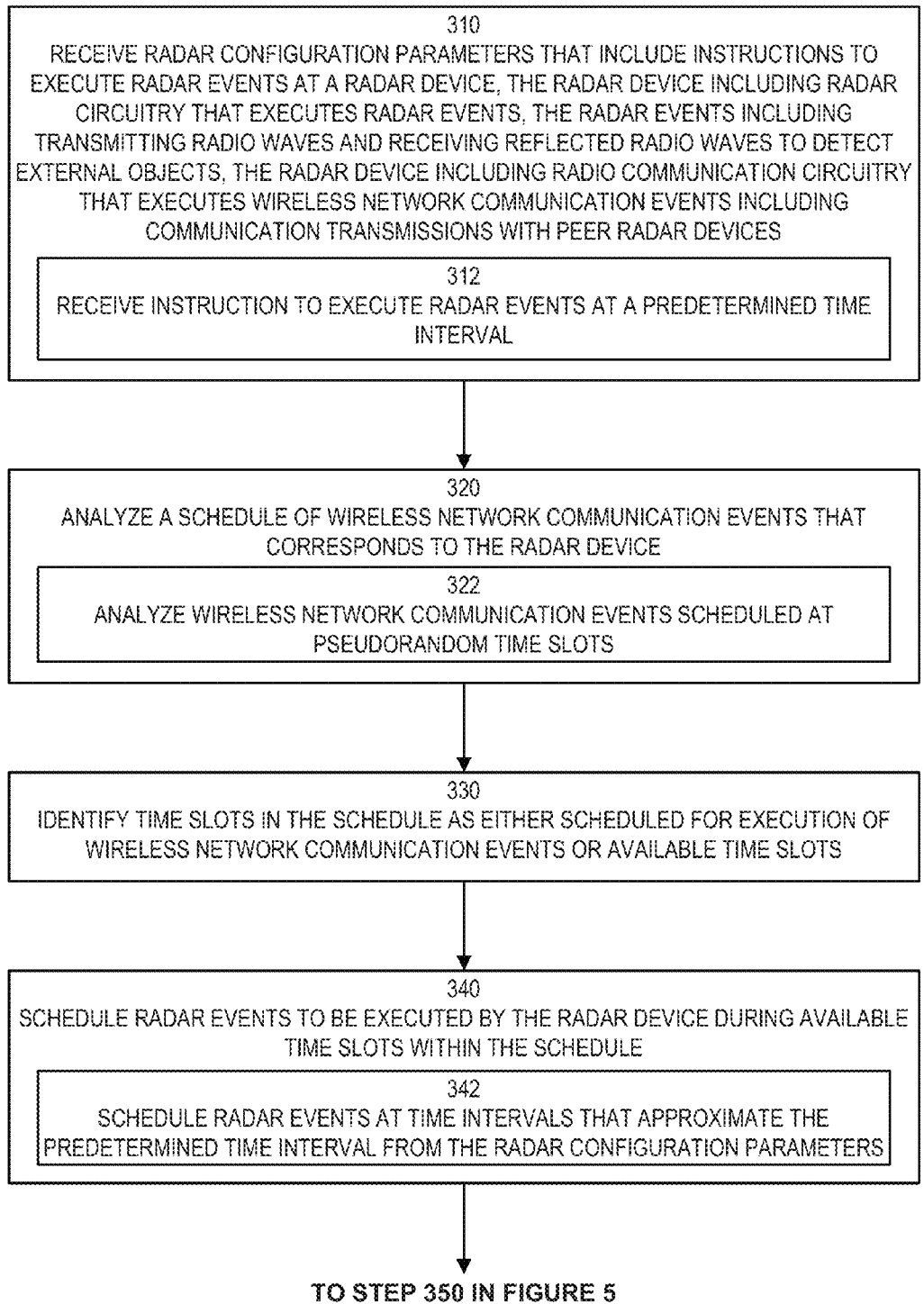
Figure 5:
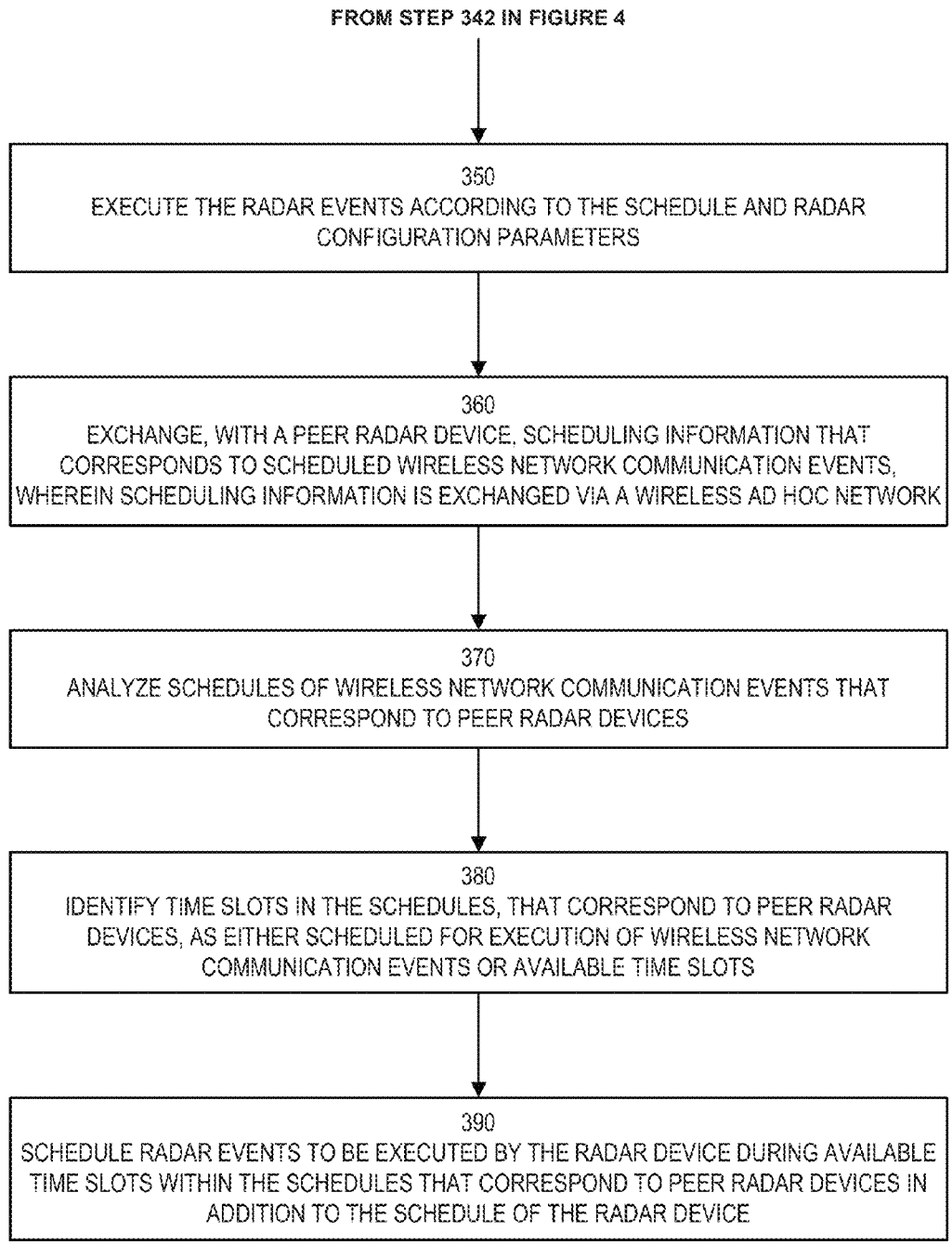

Referring now to FIGS. 4 and 5, FIGS. 4 and 5 include additional and/or alternative embodiments.

In step 310, the scheduling manager receives radar configuration parameters that include instructions to execute radar events at a radar device. The radar device includes radar circuitry that executes radar events. The radar events include transmitting radio waves and receiving reflected radio waves to detect external objects, and can also include associated processing. The radar device includes radio communication circuitry that executes wireless network communication events including communication transmissions with peer radar devices.

In step 312, the scheduling manager receives instructions to execute radar events at a predetermined time interval. Such an interval can be based on a specific mode for radar sensor operations. For example, in certain deployments, the radar node might only be necessary to detect existence of a vehicle on a long stretch of road, or other objective that does not require precise information. A corresponding radar mode might then only transmit radar signals once every one or two seconds. Other modes can be configured to result in more precision in detecting external objects. Such modes can transmit radar pulses multiple times per second.

In step 320, the scheduling manager analyzes a schedule of wireless network communication events that corresponds to the radar device.

In step 322, the scheduling manager analyzes wireless network communication events scheduled at pseudorandom time slots. As described above, radio events can be randomized to help avoid detection.

In step 330, the scheduling manager identifies time slots in the schedule as either scheduled for execution of wireless network communication events or available time slots. That is, either a given time slot or time period is either scheduled or free from any scheduled events.

In step 340, the scheduling manager schedules radar events to be executed by the radar device during available time slots within the schedule. In other words, the scheduling manager schedules radar and radio events so as not to conflict with each other.

In step 342, the scheduling manager schedules radar events at time intervals that approximate the predetermined time interval from the radar configuration parameters. With radio events scheduled using a pseudorandom schedule and radar events having a predetermined time interval for execution, there will be an overlap of events if the schedule of radio events was simply combined with a radar pulse interval. Accordingly, the scheduling manager modifies the schedule of a radar event so as not to coincide with a previously scheduled radio event, such as be selecting an available time slot nearest to the predetermined time interval, thereby approximating the time interval.

In step 350, the radar device or system executes the radar events according to the schedule and radar configuration parameters.

In step 360, the scheduling manager exchanges, with a peer radar device, scheduling information that corresponds to scheduled wireless network communication events. Such scheduling information can be exchanged via a wireless ad hoc network.

In step 370, the scheduling manager analyzes schedules of wireless network communication events that correspond to peer radar devices. In other words, the scheduling manager correlates radio events at the radar device with radio events scheduled for execution at peer radar device.

In step 380, the scheduling manager identifies time slots in the schedules (schedules that correspond to peer radar devices) as either scheduled for execution of wireless network communication events or available time slots.

In step 390, the scheduling manager schedules radar events to be executed by the radar device during available time slots within the schedules that correspond to peer radar devices in addition to the schedule of the radar device.

In other embodiments, the scheduling manager, or radar device, turns off a radio transmitter of the radar device between scheduled events, and/or turns off a radio receiver of the radar device between scheduled events. Also, analyzing the schedule of wireless network communication events that corresponds to the radar device can include a specific scheduled time for receiving a wireless transmission from a peer radar device. The radar device then powers-on the radio receiver to receive the wireless transmission from the peer radar device. In response to failing to receive the wireless transmission within a predetermined threshold amount of time, the radar device then powers-off the radio receiver.

In another embodiment, the radar device includes a processor, a memory coupled to the processor, power circuitry configured to receive a supply of power from at least one battery, a radar signal transmitter configured to transmit radar signals, and a radar signal receiver configured to receive reflected radar signals. The processor can be configured to compute radar data from received reflected radar signals, with computed radar data including a distance to an external object. Radio circuitry can be configured to execute wireless network communication events including communication transmissions with peer radar devices functioning as a network node. The memory can store instructions that, when executed by the processor, cause the radar device to perform several operations. Such operations can include: receiving radar configuration parameters that include instructions to execute radar events; analyzing a schedule of wireless network communication events that corresponds to the radar device; identifying time slots in the schedule as scheduled for execution of wireless network communication events; scheduling radar events to be executed by the radar device during time slots within the schedule that do not overlap with scheduled wireless network communication events; and executing the radar events according to the schedule and radar configuration parameters.

Yet another embodiment includes a method of scheduling wireless network communication events, wherein the radar events take scheduling priority over the radio events. Note that either the radar events or the radio events could have priority at any given time depending on a specific implementation. In such an embodiment, the scheduling manager analyzes a schedule of radar events that corresponds to the radar device. The scheduling manager identifies time slots in the schedule as scheduled for execution of radar events. The scheduling manager schedules wireless network communication events to be executed by the radar device during time slots within the schedule that are free from scheduled wireless network communication events. The radar device can then execute the wireless network communication events and radar events according to the schedule and radar configuration parameters. In this embodiment, receiving radar configuration parameters that include instructions to execute radar events at a radar device can include receiving instructions to execute radar events at a predetermined time interval. Additionally, scheduling wireless network communication events can include scheduling wireless network communication events at pseudorandom time slots.

In yet other embodiments, radar events and radio events can essentially share and/or exchange scheduling priorities, or have a system of priorities, based on predetermined signaling events, operator configured parameters, objects being currently detected in a radar field, need to locate a specific unit, etc. Radar events and radio events can be identified or defined as both being a type of signaling event and type of signal. Accordingly, the scheduling manager can schedule signaling events so that only one type of signaling event occurs, or is being executed, at any given point in time. In other words, radar device 100 transmits and/or receives only one type of signaling event or type of signal at a time.

In alternative embodiments, radar device 100 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Radar device 100 of the present example can include an interconnect that couples a memory system, a processor, an I/O interface, and a communications interface. The I/O interface can provide connectivity to peripheral devices or modules such as input devices including a computer mouse, a keyboard, a selection tool to move a cursor, display screen, etc.

The communications interface enables the scheduling manager of radar device 100 to communicate over a network and, if necessary, retrieve any data required to create views, process content, communicate with a user, etc. according to embodiments herein.

The memory system is encoded with a scheduling manager that supports functionality as discussed above and as discussed further below. The scheduling manager (and/or other resources as described herein) can be embodied as software code such as data and/or logic instructions that support processing functionality according to different embodiments described herein.

During operation of one embodiment, a processor accesses the memory system via the use of a wired or wireless interconnect to launch, run, execute, interpret or otherwise perform the logic instructions of the scheduling manager. Execution of the scheduling produces processing functionality. In other words, the scheduling manager process represents one or more portions of the scheduling manager performing within or upon the processor in the radar device 100.

It should be noted that, in addition to the scheduling manager process that carries out method operations as discussed herein, other embodiments herein include the scheduling manager itself (i.e., the un-executed or non-performing logic instructions and/or data). The scheduling manager may be stored on a non-transitory, tangible computer-readable storage medium including computer readable storage media such as floppy disk, hard disk, optical medium, etc. According to other embodiments, the scheduling manager can also be stored in a memory type system such as in firmware, read only memory (ROM), or, as in this example, as executable code within the memory system.

In addition to these embodiments, it should also be noted that other embodiments herein include the execution of the scheduling manager in the processor as the scheduling manager process. Thus, those skilled in the art will understand that the radar device 100 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method of scheduling radar events, the computer-implemented method comprising:
    providing a radar device including a processor and a memory coupled to the processor, the memory storing predetermined instructions to control operations of the radar device, the radar device further including radar circuitry that executes radar events, the radar events including transmitting radio waves and receiving reflected radio waves to detect external objects, the radar device further including radio communication circuitry that executes wireless network communication events including communication transmissions with peer radar devices, the radar device having a corresponding schedule of wireless network communication events; and
    executing, by the processor, the predetermined instructions stored in the memory to cause the radar device to perform the operations of:
        receiving radar configuration parameters that include instructions to execute radar events at the radar device;
        analyzing the schedule of wireless network communication events that corresponds to the radar device;
        identifying time slots in the schedule as either scheduled for execute of wireless network communication events or available time slots;
        scheduling radar events to be executed by the radar device during available time slots within the schedule; and
        executing the radar events according to the schedule and radar configuration parameters.

2. The computer-implemented method of claim 1, wherein receiving radar configuration parameters that include instructions to execute radar events at a radar device includes receiving instructions to execute radar events at a predetermined time interval.

3. The computer-implemented method of claim 2, wherein analyzing the schedule of wireless network communication events includes analyzing wireless network communication events scheduled at pseudorandom time slots.

4. The computer-implemented method of claim 3, wherein scheduling radar events to be executed by the radar device during available time slots within the schedule includes scheduling radar events at time intervals that approximate the predetermined time interval from the radar configuration parameters.

5. A computer-implemented method of scheduling radar events, the computer-implemented method comprising:
    providing a radar device including a processor and a memory coupled to the processor, the memory storing predetermined instructions to control operations of the radar device, the radar device further including radar circuitry that executes radar events, the radar events including transmitting radio waves and receiving reflected radio waves to detect external objects, the radar device further including radio communication circuitry that executes wireless network communication events including communication transmissions with peer radar devices; and
    executing by the processor the predetermind instructions stored in the memory to cause the radar device to perform the operations of:
        receiving radar configuration parameters that include instructions to execute radar events at a radar device;
        analyzing a schedule of wireless network communication events that corresponds to the radar device;
        identifying time slots in the schedule as either scheduled for execution of wireless network communication events or available time slots;
        scheduling radar events to be executed by the radar device during available time slots within the schedule;
        executing the radar events according to the schedule and radar configuration parameters;

analyzing schedules of wireless network communication events that correspond to peer radar devices;
identifying time slots in the schedules, that correspond to peer radar devices, as either scheduled for execution of wireless network communication events or available time slots; and
scheduling radar events to be executed by the radar device during available time slots within the schedules that correspond to peer radar devices in addition to the schedule of the radar device.

6. The computer-implemented method of 5, further comprising:
turning off a radio transmitter of the radar device between scheduled events; and
turning off a radio receiver of the radar device between scheduled events.

7. A computer-implemented method of scheduling radar events, the computer-implemented method comprising:
providing a radar device including a processor and a memory coupled to the processor, the memory storing predetermined instruction to control operations of the radar device,the radar device further including radar circuitry that executes radar events, the radar events including transmitting radio waves and receiving reflected radio waves to detect external objects, the radar device further including radio communication circuitry that executes wireless network communication events including communication transmissions with peer radar devices; and
executing, by the processor, the predetermined instructions stored in the memory to cause the radar device to perform the operations of:
receiving radar configuration parameters that include instructions to execute radar events at a radar device;
analyzing a schedule of wireless network communication events that corresponds to the radar device;
identifying time slots in the schedule as either scheduled for execution of wireless network communication events or available time slots;
scheduling radar events to be executed by the radar device during available time slots within the schedule;
executing the radar events according to the schedule and radar configuration parameters; and
exchanging, with a peer radar device, scheduling information that corresponds to scheduled wireless network communication events, wherein scheduling information is exchanged via a wireless ad hoc network.

8. The computer-implemented method of claim 7, further comprising:
wherein analyzing a schedule of wireless network communication events that corresponds to the radar device includes a specific scheduled time for receiving a wireless transmission from a peer radar device;
powering-on a radio receiver to receive the wireless transmission from the peer radar device; and
in response to failing to receive the wireless transmission within a predetermined threshold amount of time, powering-off the radio receiver.

9. A radar device comprising:
a processor;
a memory coupled to the processor;
power circuitry configured to receive a supply of power from at least one battery;
a radar signal transmitter configured to transmit radar signals;
a radar signal receiver configured to receive reflected radar signals;
the processor configured to compute radar data from received reflected radar signals, computed radar data including a distance to an external object; and
radio circuitry configured to execute wireless network communication events including communication transmissions with peer radar devices functioning as a network node,
wherein the radar device has a corresponding schedule of wireless network communication events, and
wherein the memory is configured to store instructions that, when executed by the processor, cause the radar device to perform the operations of:
receiving radar configuration parameters that include instructions to execute radar events;
analyzing the schedule of wireless network communication events that corresponds to the radar device;
identifying time slots in the schedule as scheduled for execution of wireless network communication events;
scheduling radar events to be executed by the radar device during time slots within the schedule that do not overlap with scheduled wireless network communication events; and
executing the radar events according to the schedule and radar configuration parameters.

10. The radar device of claim 9, wherein receiving radar configuration parameters that include instructions to execute radar events includes receiving instructions to execute radar events at a predetermined time interval.

11. The radar device of claim 10, wherein analyzing the schedule of wireless network communication events includes analyzing wireless network communication events scheduled at pseudorandom time slots.

12. The radar device of claim 11, wherein scheduling radar events to be executed by the radar device during time slots that do not overlap with scheduled wireless network communication events includes scheduling radar events at time intervals that approximate the predetermined time interval from the radar configuration parameters.

13. The radar device of claim 9, the memory storing further instructions that, when executed by the processor, cause the radar device to perform the operation of:
turning off a radio transmitter of the radar device between scheduled events.

14. The radar device of claim 13, the memory storing further instructions that, when executed by the processor, cause the radar device to perform the operation of:
further comprising turning off a radio receiver of the radar device between scheduled events.

15. A radar device comprising:
a processor;
a memory coupled to the processor;
power circuitry configured to receive a supply of power from at least one battery;
a radar signal transmitter configured to transmit radar signals;
a radar signal receiver configured to receive reflected radar signals;
the processor configured to compute radar data from received reflected radar signals, computed radar data including a distance to an external object; and
radio circuitry configured to execute wireless network communication events including communication transmissions with peer radar devices functioning as a network node, wherein the memory is configured to store instructions that, when executed by the processor, cause the radar device to perform the operations of:
receiving radar configuration parameters that include instructions to execute radar events;
analyzing a schedule of wireless network communication events that corresponds to the radar device;
identifying time slots in the schedule as scheduled for execution of wireless network communication events;
scheduling radar events to be executed by the radar device during time slots within the schedule that do not overlap with scheduled wireless network communication events;
executing the radar events according to the schedule and radar configuration parameters; and
exchanging, with a peer radar device, scheduling information that corresponds to scheduled wireless network communication events, wherein scheduling information is exchanged via a wireless ad hoc network.

16. The radar device of claim 15, the memory storing further instructions that, when executed by the processor, cause the radar device to perform the operations of:
wherein analyzing a schedule of wireless network communication events that corresponds to the radar device includes a specific scheduled time for receiving a wireless transmission from a peer radar device;
powering-on a radio receiver to receive the wireless transmission from the peer radar device; and
in response to failing to receive the wireless transmission within a predetermined threshold amount of time, powering-off the radio receiver.

17. A computer-implemented method of scheduling wireless network communication events, the computer-implemented method comprising:
providing a radar device including a processor and a memory coupled to the processor, the memory storing predetermined instructions to control operations of the radar device, the radar device further including radar circuitry that executes radar events, the radar events including transmitting radio waves and receiving reflected radio waves to detect external objects, the radar device further including radio communication circuitry that executes wireless network communication events including communication transmissions with peer radar devices, the radar device having a corresponding schedule of radar events; and
executing, by the processor, the predetermined instructions stored in the memory to cause the radar device to perform the operations of:
receiving radar configuration parameters that include instructions to Execute radar events at a radar device;
analyzing the schedule of radar events that corresponds to the radar device;
identifying time slots in the schedule as scheduled for execution of radar events;
scheduling wireless network communication events to be executed by the radar device during time slots within the schedule that are free from scheduled wireless network communication events; and
executing the wireless network communication events and radar events according to the schedule and radar configuration parameters.

18. The computer-implemented method of claim 17, wherein receiving radar configuration parameters that include instructions to execute radar events at a radar device includes receiving instructions to execute radar events at a predetermined time interval.

19. The computer-implemented method of claim 18, wherein scheduling wireless network communication events to be executed by the radar device during time slots within the schedule that are free from scheduled wireless network communication events includes scheduling wireless network communication events at pseudorandom time slots.

20. A computer-implemented method of scheduling wireless network communication events, the computer-implemented method comprising:
providing a radar device including a processor and a memory coupled to the processor, the memory storing predetermined instructions to control operations of the radar device, the radar device further including radar circuitry that executes radar events, the radar events including transmitting radio waves and receiving reflected radio waves to detect external objects, the radar device further including radio communication circuitry that executes wireless network communication events including communication transmissions with peer radar devices; and
executing, by the processor, the predetermined instructions stored in the memory to cause the radar device to perform the operations of:
receiving radar configuration parameters that include instructions to Execute radar events at a radar device;
analyzing the schedule of radar events that corresponds to the radar device;
identifying time slots in the schedule as scheduled for execution of radar events;
scheduling wireless network communication events to be executed by the radar device during time slots within the schedule that are free from scheduled wireless network communication events;
executing the wireless network communication events and radar events according to the schedule and radar configuration parameters;
turning off a radio transmitter of the radar device between scheduled events;
turning off a radio receiver of the radar device between scheduled events; and
exchanging, with a peer radar device, scheduling information that corresponds to scheduled wireless network communication events, wherein scheduling information is exchanged via a wireless ad hoc network.

* * * * *